US008083827B2

(12) United States Patent
Patel

(10) Patent No.: US 8,083,827 B2
(45) Date of Patent: Dec. 27, 2011

(54) LOW DENSITY MIST COLLECTOR PAD

(75) Inventor: Kantilal P. Patel, Sugar Land, TX (US)

(73) Assignee: ACS Industries, LP, Houston, TX (US)

( * ) Notice: Subject to any disclaimer, the term of this patent is extended or adjusted under 35 U.S.C. 154(b) by 0 days.

(21) Appl. No.: 12/728,909

(22) Filed: Mar. 22, 2010

(65) Prior Publication Data
US 2010/0170399 A1 Jul. 8, 2010

Related U.S. Application Data

(63) Continuation of application No. 11/446,656, filed on Jun. 5, 2006, now abandoned.

(51) Int. Cl.
*B01D 24/00* (2006.01)
(52) U.S. Cl. ............... 55/525; 55/485; 55/487; 55/522; 55/526; 55/DIG. 25
(58) Field of Classification Search ............... 55/485, 55/487, 522, 525, 526, DIG. 25
See application file for complete search history.

(56) References Cited

U.S. PATENT DOCUMENTS

| | | | | | |
|---|---|---|---|---|---|
| 2,881,116 | A | * | 4/1959 | Siegfried | 203/11 |
| 3,659,402 | A | * | 5/1972 | Alliger | 96/297 |
| 3,780,872 | A | * | 12/1973 | Pall | 210/493.1 |
| 3,880,626 | A | * | 4/1975 | Griwatz et al. | 55/485 |
| 4,683,010 | A | * | 7/1987 | Hartmann | 148/287 |
| 4,744,806 | A | * | 5/1988 | Ozolins et al. | 95/273 |
| 5,151,198 | A | * | 9/1992 | McCullough et al. | 95/63 |
| 5,279,731 | A | * | 1/1994 | Cook et al. | 210/232 |
| 5,449,500 | A | * | 9/1995 | Zettel | 422/179 |
| 5,665,131 | A | * | 9/1997 | Hock et al. | 55/487 |
| 7,291,196 | B1 | * | 11/2007 | Lerner | 55/486 |
| 2006/0037298 | A1 | * | 2/2006 | Greenwood | 55/525 |

OTHER PUBLICATIONS

Perry et al. (Perry's Chemical Engineers' Handbook), 6th Ed., McGraw-Hill, 1984, pp. 18-78-18.81.*
York et al. "Wire Mesh Mist Elminators" Chem. Engr. Progress vol. 59 No. 6 Jun. 1963, pp. 2-7.*
Calgon Carbon "Understanding Carbon Mesh Size" <http://www.calgoncarbon.com/solutions/documents/UnderstandingCarbonMeshSize.pdf> Water Technology, dated Mar. 1993, pp. 1-2.*
ACS Industries, Inc.'s product brochure entitled "The Engineered Mist Eliminator," ACS Industries, LP, Houston, TX, 2004.
ACS Industries, Inc.'s corporate brochure, ACS Industries, Inc. Lincoln, RI, 2010.
Perry, M., "Entrainment Characteristics of the ACS Max Cap® Mist Eliminator" presented at Process Science and Technology Center, Spring Meeting, Austin, TX, Apr. 2010.
Seibert et al., "Mist Eliminators MaxCap and Style 4BA: Air/Water Performance Characteristics," University of Texas, Separations Research Program, Austin, TX, Apr. 8, 2010.

* cited by examiner

*Primary Examiner* — Jason M Greene
*Assistant Examiner* — Anthony Shumate
(74) *Attorney, Agent, or Firm* — Maurice M. Klee

(57) ABSTRACT

A wire mesh mist collector pad having multiple density zones, the zones being arranged other than to provide a constantly increasing density gradient, provides a reduced pressure drop and increased capacity. For example, the pad can include at least three zones with the zones arranged so that the density gradient in the direction of gas flow through the pad varies from low to high to low or from high to low to high.

16 Claims, 10 Drawing Sheets

LOW DENSITY MIST COLLECTOR PAD

CROSS-REFERENCE TO RELATED APPLICATIONS

This application is a continuation of U.S. application Ser. No. 11/446,656 filed Jun. 5, 2006, abandoned, the contents of which in its entirety is hereby incorporated by reference.

BACKGROUND OF THE INVENTION

1. Field of the Invention

This invention relates to improved mesh for removing entrained or suspended droplets or particulates in a gas stream.

2. The State of the Art

Many chemical and other industrial processes create a gas stream that includes solid and/or liquid particles that must be removed from the gas stream. These particles are typically liquid droplets created by entrainment, impingement, chemical reaction, or condensation, but can also be solid particles.

Perhaps the most typical of methods for removing these unwanted particles is a device which causes the gas/particle flow to change direction. Because the particle has a higher density than the gas of the stream, the momentum of the particle will tend to make the particle travel in a straight line and not change direction as quickly as the gas. For example, in the case of a stream of water droplets in air, the gas stream can be passed through a wire mesh: the liquid droplets cannot negotiate the tortuous path through the mesh and so they land on and adhere to the mesh, and coalesce, by surface tension, and then run off from the mesh due to gravity. Gas-liquid separations that use demisting pads include gas plants, refineries, steam-generating power plants, gas scrubbers, and various other operations used in producing petrochemicals and speciality chemicals.

Another device typically used for removing liquid or solid particles from a gas stream includes a series of wave plates (vanes) arranged parallely, each vane being a thin sheet that is formed into hills and valleys. The vanes are arranged spaced closely together. The gas stream enters one side and takes a zig-zag path to reach the other side. The entrained droplets cannot negotiate the rapid zig-zag and impinge on the vane, where they cling and run down the wall. While vanes are more robust, they are significantly heavier and more costly to manufacture than a wire mesh mist collector.

The typical industry standard for mesh pads is to use 0.011 inch wire at a density of 9 lb./ft$^3$. The wire commonly used is 304SS, or any suitable alloy, metal, or plastic chemically compatible with the process stream. Some operations use a multilayered pad having the lowest density pad upstream and the highest density pad downstream. Although termed "multilayered," the pad actually has multiple zones, where each zone is comprised of one or more layers of the same mesh. Multilayer pads presently used in the industry have two or three zones at most. The pad must remove entrained material but without causing any significant pressure drop. In a typical plant, a pressure drop of one inch of water across a pad amounts to hundreds of thousands of dollars a year in a one billion SCF/d plant to push the gas around with the increased pressure drop.

SUMMARY OF THE INVENTION

In light of the foregoing, among various objects of this invention are to make a pad that has good if not improved capacity, to make the pad lighter and so use less material, thereby making the pad less costly to manufacture, and to provide a lower pressure drop across the pad, thereby reducing the operating cost of the processing facility, and especially providing all of these benefits in a single device.

In summary, this invention provides a multizone mesh pad having a lower density and a higher capacity than existing pads, and which is made with a smaller diameter wire. The pad is made by knitting the wire into a tube, flattening the tube in one direction, then crimping the tube in a different direction, optionally crimping the tube in yet a different orientation, forming cut lengths of various crimped mesh tubes into a pad by stacking the lengths in a desired order to having alternating high and low density zones, and fixing the pad to a grid for installation in process equipment.

In a particular embodiment, this invention provides a multilayer pad having at least three zones of alternating high and low density mesh, each zone comprising at least one layer of mesh, more preferably at least four zones, even more preferably at least five zones, and most preferably at least six zones. The mist collector pads of this invention do not have an increasing density gradient across the entire pad, but instead alternate the density gradient.

DETAILED DESCRIPTION OF SPECIFIC EMBODIMENTS

Figure 1:
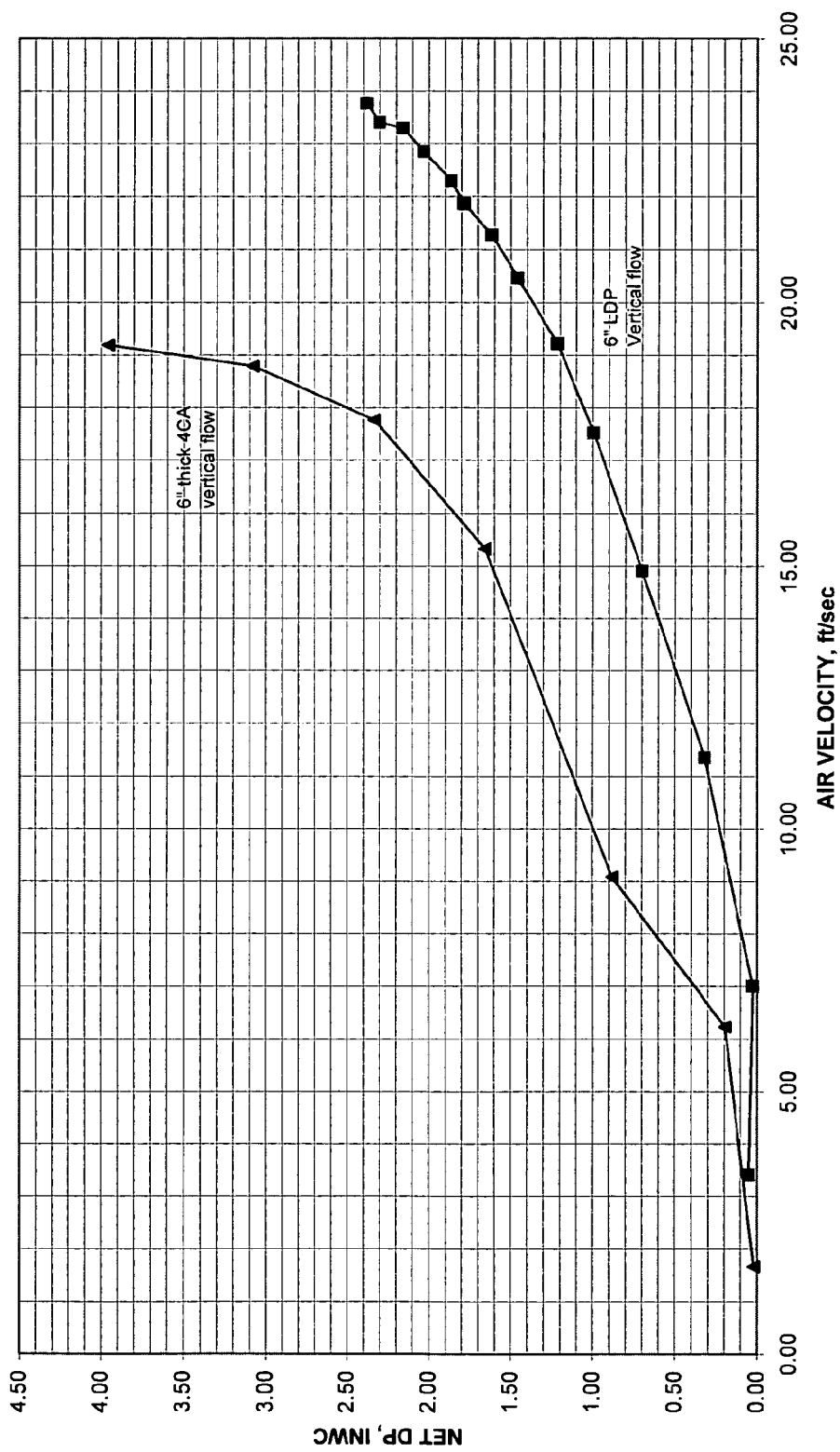
FIGS. 1-10 depict results of testing the multilayer pad of this invention against other separation devices, with the comparative pressure drop data shown in odd-numbered figures and comparative entrainment data shown in even-numbered figures.

The mesh used to make the pads of this invention is made with a conventional knitting machine that knits wire instead of thread. Although it is preferred in this invention to use a thinner wire, such as 0.006" as compared with the 0.011" wire conventionally used in the industry, the advantages obtained by alternating high and low density meshes to make a multilayer pad provides improved capacity and a lower pressure drop. The wire must be chosen to be inert in the environment of use, and type 304SS or 304L is typically used when droplets are removed from an aqueous or organic stream; 316L, Alloy 20, and polytetrafluoroethylene-based polymers (TEFLON) are used for sulfuric acid; 410SS and glass are used for mild chemicals; a nickel-copper alloy (MONEL) is used for corrosive chemicals, nickel is used for caustic; and the like as is known in the industry.

Multilayer pads in the prior art have a density gradient increasing in the direction of flow; for example, a lower density pad upstream and a higher density pad downstream. Surprising it has been found that simply varying the density between adjacent layers of a multilayer pad provides improved capacity and a lower pressure drop. Thus, alternating from high to low to high, or low to high to low, provides improvements. As shown below in Example 4, in comparison with a pad having the same total thickness using meshes of lower density (5 lb/ft$^3$ and 9 lb/ft$^3$) than the embodiment of the invention in Example 4 (9 lb/ft$^3$ and 12 lb/ft$^3$ mesh densities), the present invention provides a lower pressure drop and has a higher capacity.

The pads of this invention are first made by knitting a wire, such as 0.006" type 304SS wire, on a conventional knitting machine to produce a knitted tube or sock. The knitted tube is first flattened by being run between roller. The flattened pad is then crimped by being run between two rollers, at least one having a pattern (like an embossing pattern) thereon so that the mesh tube is flattened and crimped. The crimped mesh tube may optionally then be crimped in a different direction or orientation between a second pair of rollers, having the same or a different pattern, the rollers oriented differently with respect to the mesh than the first pair. For example, if the first pair of crimping rollers is disposed horizontally, the mesh is fed horizontally; then, without changing the orientation of the mesh, it is run between a second pair of crimping rollers disposed vertically. The two pairs of crimping rollers need not be orthogonal to each other, although that is preferred; it is enough that the orientation of the second pair is different than the orientation of the first pair with respect to a given tube orientation. The resulting tube has a lower density than the original knitted and uncrimped tube. By varying the number of wires used to knit the tube and the number of layers of mesh used to make a given layer in the mist collector, as well as the number of crimping operations, a layer having a desired density can be produced. Increased crimping lowers the final density of the mesh. In the examples following, one mesh style (3BF) is made from 0.006" wire into a mesh layer having a density of about 7.2 lb/ft$^3$ (120 ft$^2$/ft$^3$; 98.6% voids), and another mesh style (3BA) is made with the same wire diameter into a mesh layer having a density of 12.0 lb/ft$^3$ (200 ft$^2$/ft$^3$; 97.6% voids).

The mesh layers are then layered or stacked in a desired order on a frame or grid that both supports the multilayer pad and connects it to the process vessel (and holds it in place against the gas flow). The grid is secured and the mist collector is then installed into the process equipment.

EXAMPLES

A sample multilayer pad according to this invention was compared with a conventional multilayer pad on a testing apparatus. In the testing apparatus, a mixture of air and water was used as the test stream, using a 15 HP radial blade blower with an inlet damper for air flow control, a 12 inch., Sch. 20, 16 foot long exit pipe from the blower, and using a Dwyer model DS-400-12 multi-orifice flow sensor for air flow measurement, all for supplying a vertical test chamber. The outlet from the test chamber had a 40 inch long Sch. 20 pipe including a FilterSense Model LM-70 Mist Gauge for entrainment measurement. The pressure drop was measured with an inclined manometer (measurement in inches of water column), the test system temperature having been measured with a Weksler Instruments dial thermometer with 1° F. gradations. The inlet loading was applied with either full cone water (Bete SCM9SQ), but more preferably, as in these examples, using a two-fluid (Spraying Systems 1/2J+SU 79) air-water spray nozzle. The water was recycled to the inlet using a 2HP Teel centrifugal pump and metered using a zero to five GPM rotameter. The multilayer pad devices were tested to determine their capacity to eliminate water drops from the air stream. Capacity was determined by the air velocity at which breakthrough started to occur. The amount of water in the exit stream was determined using an electric induction probe (model LM 30, ProFlow brand series, from Impolit Environmental Control Corp., Beverly, Mass.). The outputs of the probe were used to calculate entrainment ENTR as $gal_{water}/mmSCF_{air}$ (gallons of water per million standard cubic feet of air).

The sample pad (designated below as "LDP") was constructed by layering the aforementioned style 3BA and 3BF meshes as follows, all being made with 0.006" 304SS wire, to make the pad designated as "LDP" herein, all of the 3BF layers having been crimped twice and the 3BA layers having been crimped once. A "layer" in the pad construction is a single crimped knit tube. The sample LDP had the following construction (the direction of gas flow being bottom to top):

Top
6 layers of 3BF
1 layer of 3BA
2 layers of 3BF
1 layer of 3BA
2 layers of 3BF
1 layer of 3BA
3 layers of 3BF
1 layer of 3BA
6 layers of 3BF
Bottom The direction of the gas flow in the testing apparatus is vertically from bottom to top. The total thickness of the multilayer pad was six inches and the average density was 2.9 lb/ft$^3$.

Example 1

Figure 2:
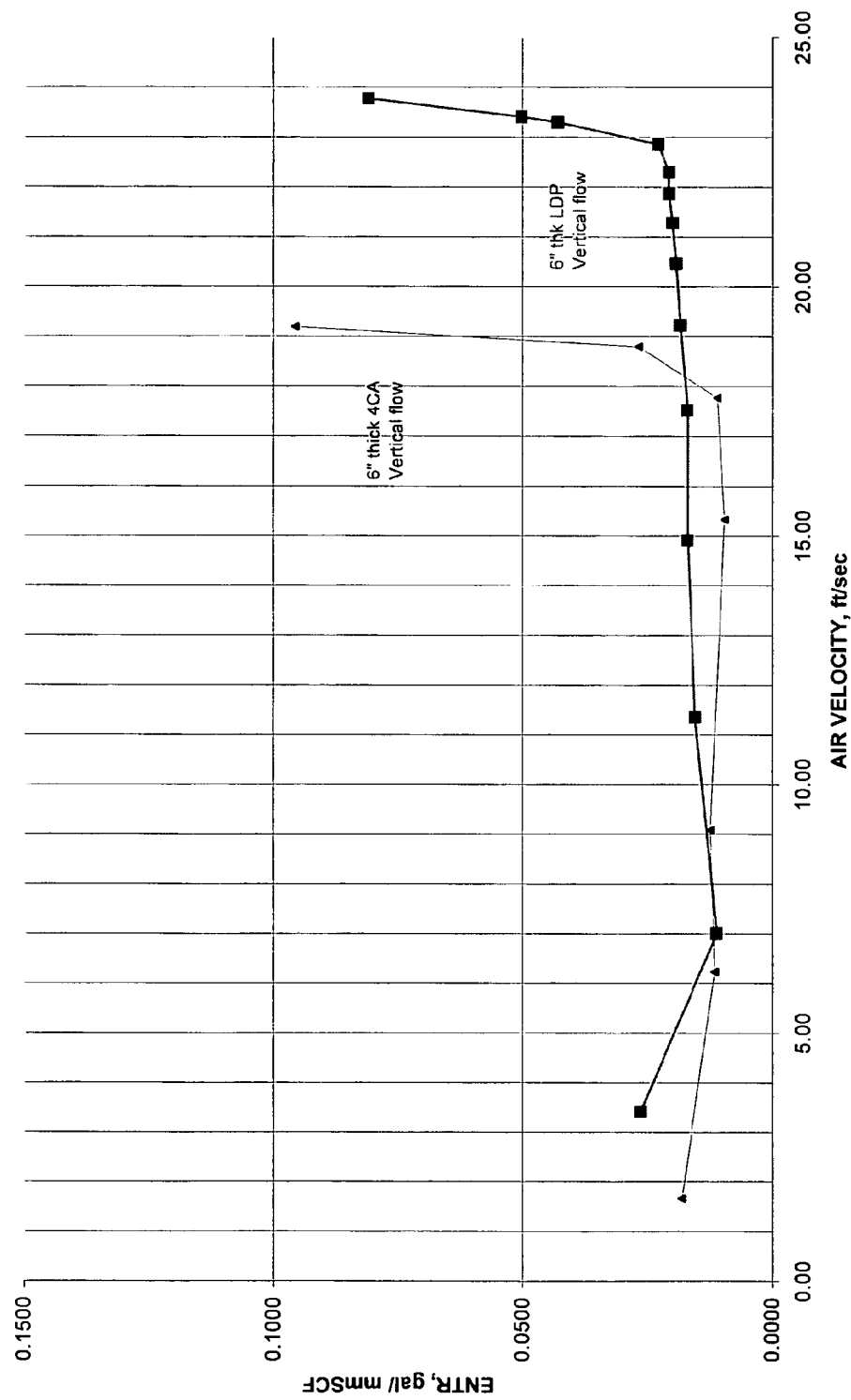

The LDP mist collector pad was tested against a six inch thick style 4CA pad, made with 0.011" wire, having a density of 9 lb/ft$^3$, 85 ft$^2$/ft$^3$ surface area, and 98.2% voids, layered to provide a thickness of six inches. As shown in FIG. 1, the LDP pad has significantly less pressure drop over the entire air velocity range, and FIG. 2 shows that breakthrough on the 4CA pad occurred at about 19 ft/s air velocity whereas the LDP pad experienced breakthrough at about 23 ft/s.

Example 2

Figure 3:
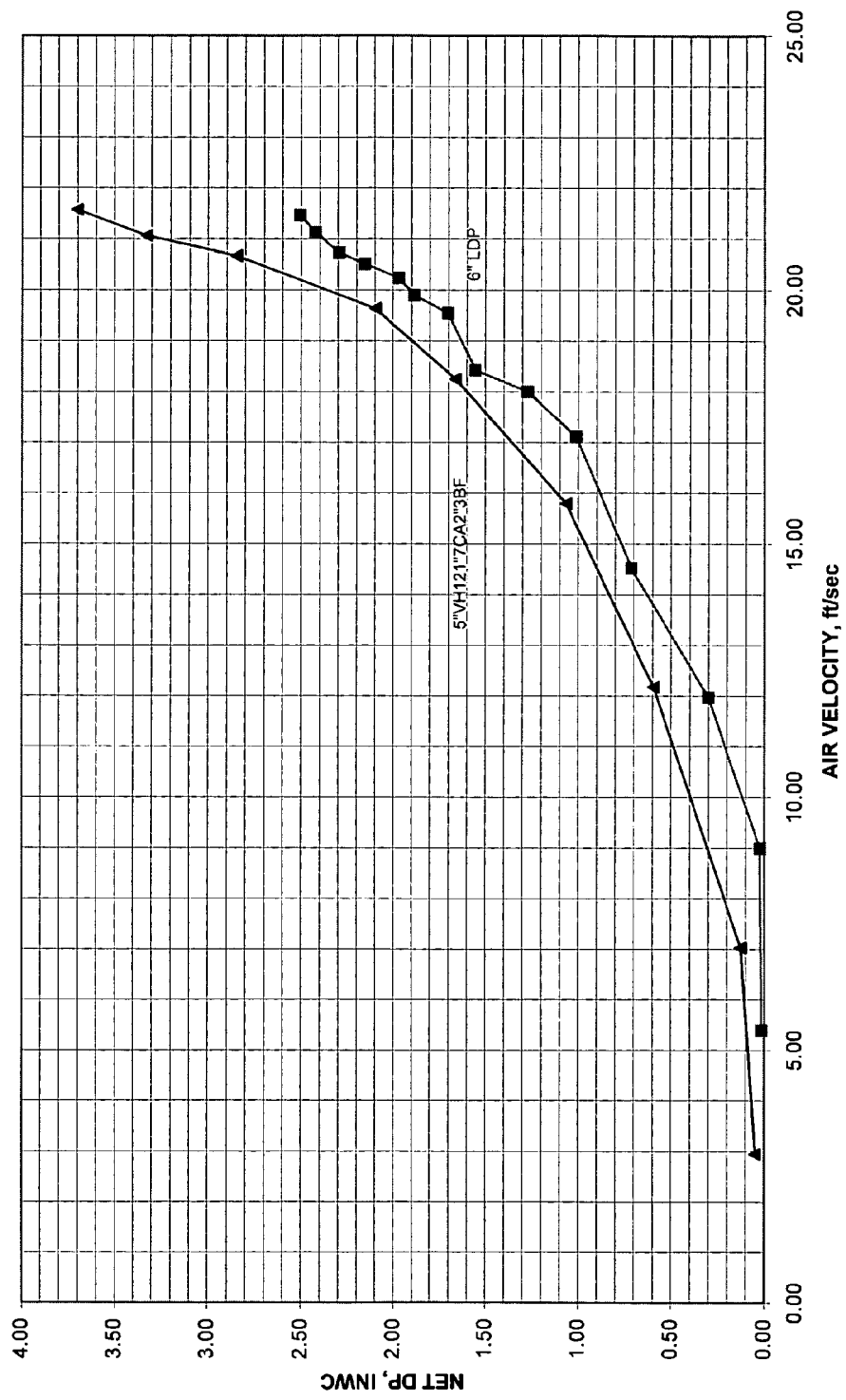
Figure 4:
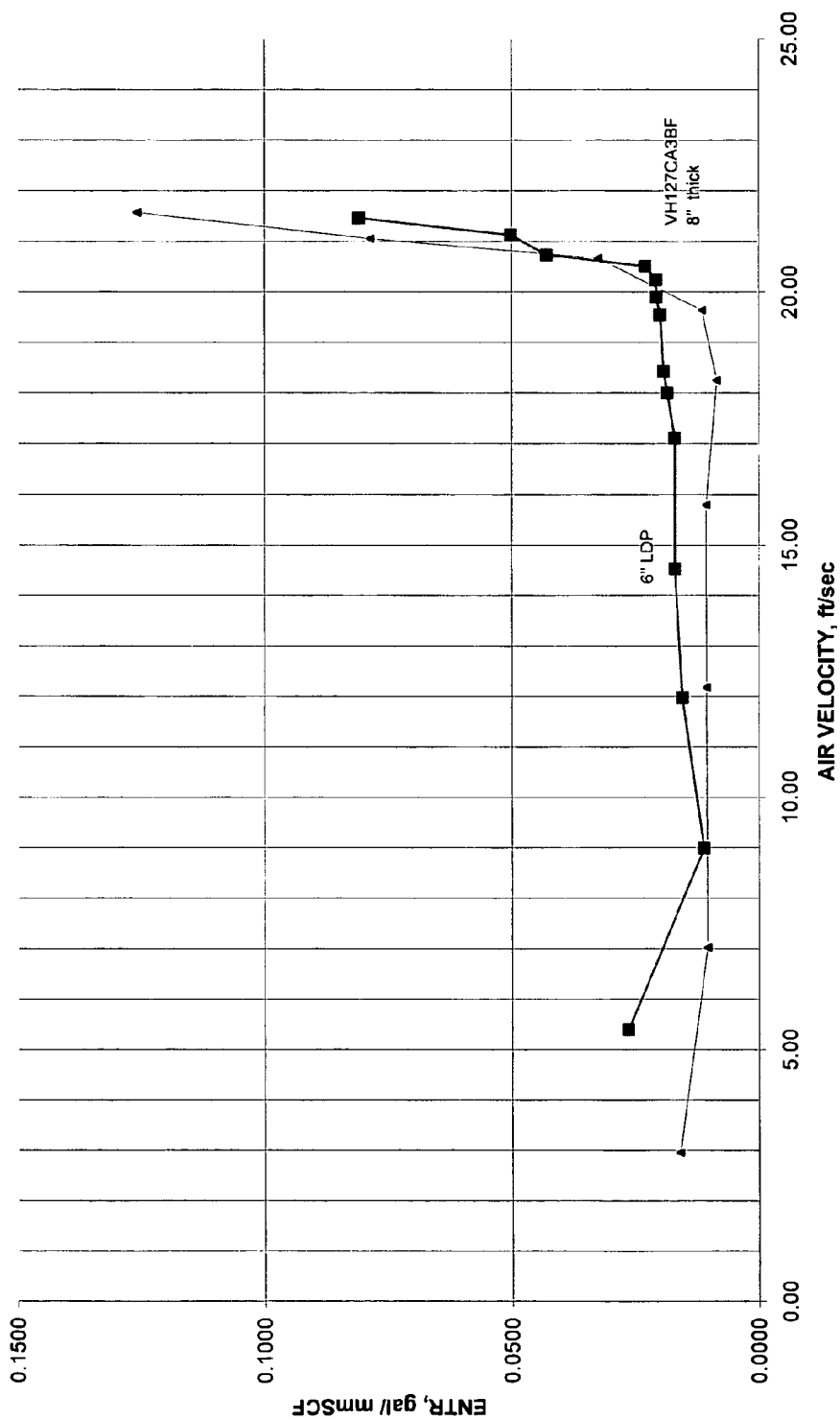

An eight inch comparison device was made (upstream to downstream) using five inches of a conventional vane separator (VH12), one inch of 7CA mesh, and two inches of 3BF style mesh. The style 7CA mesh is made from 0.011" wire, has a density of 5.0 lb/ft$^3$, a surface of 45 ft$^2$/ft$^3$, and 99.0% voids. This VH127CA3BF pad was tested against the LDP pad of this invention. As shown in FIG. 3, the LDP pad had a lower pressure drop throughout the air velocity range, and FIG. 4 shows the pads have comparable breakthrough, yet the LDP pad is only three-quarters the thickness of the comparison pad.

Example 3

Figure 5:
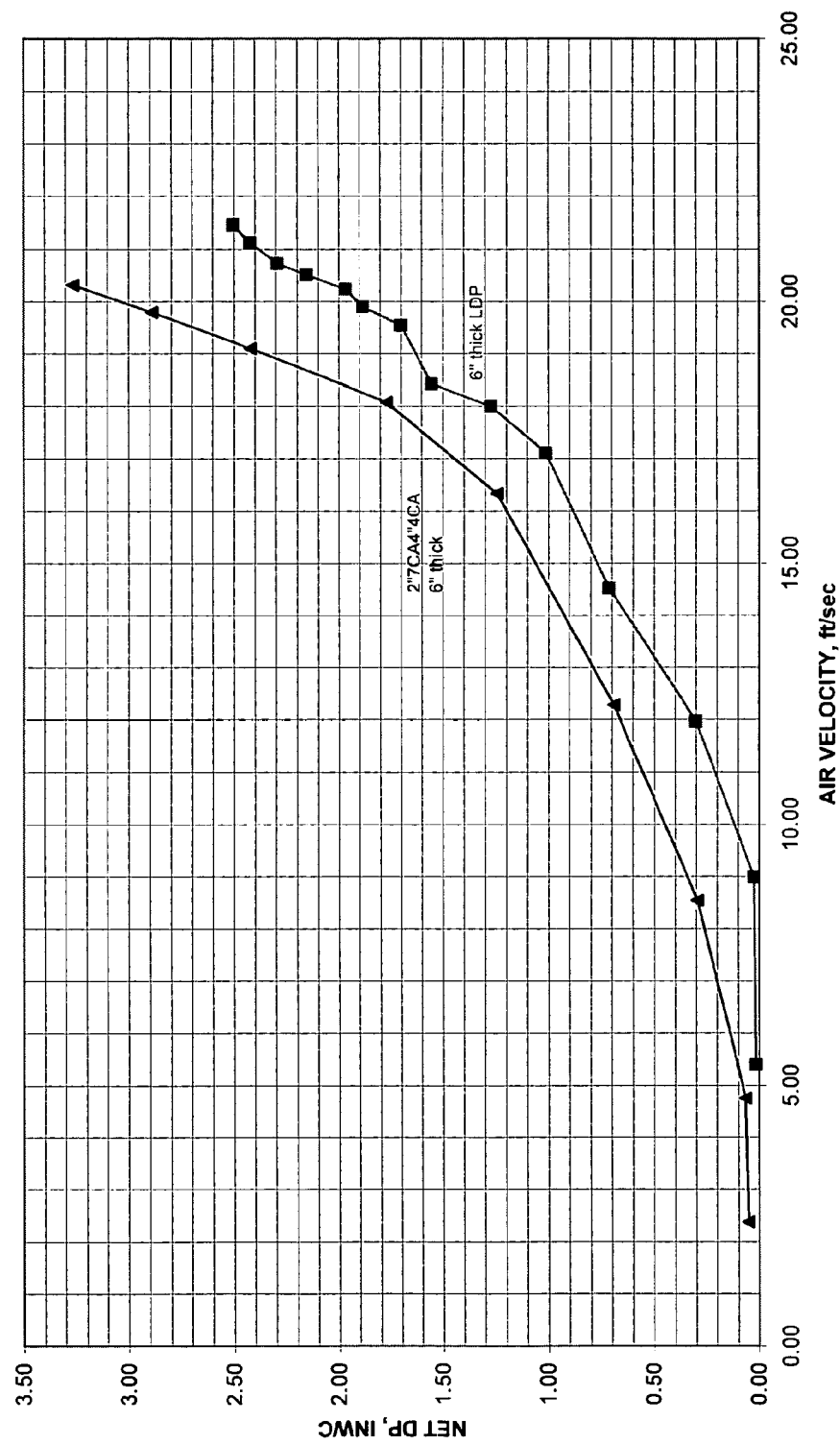
Figure 6:
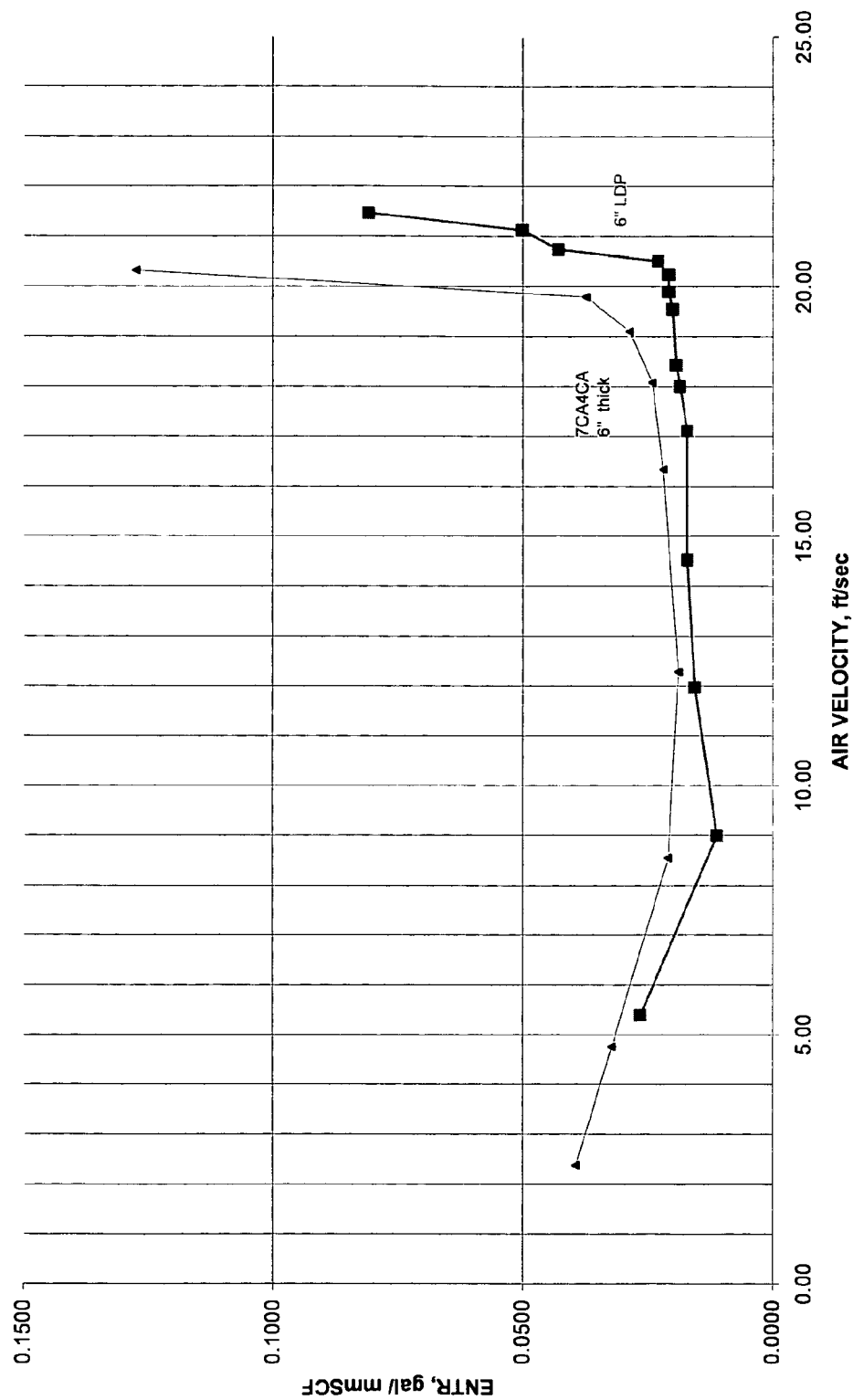

A six inch pad (2"7CA4"4CA) was made with two inches of 7CA style mesh and four inches of style 4CA mesh to produce a six inch pad. This was tested against the six inch LDP pad. As shown in FIG. 5, the LDP pad had a lower pressure drop through the flow range, and FIG. 6 shows that breakthrough occurred at a higher air velocity in the LDP pad than with the comparison pad.

Example 4

Figure 7:
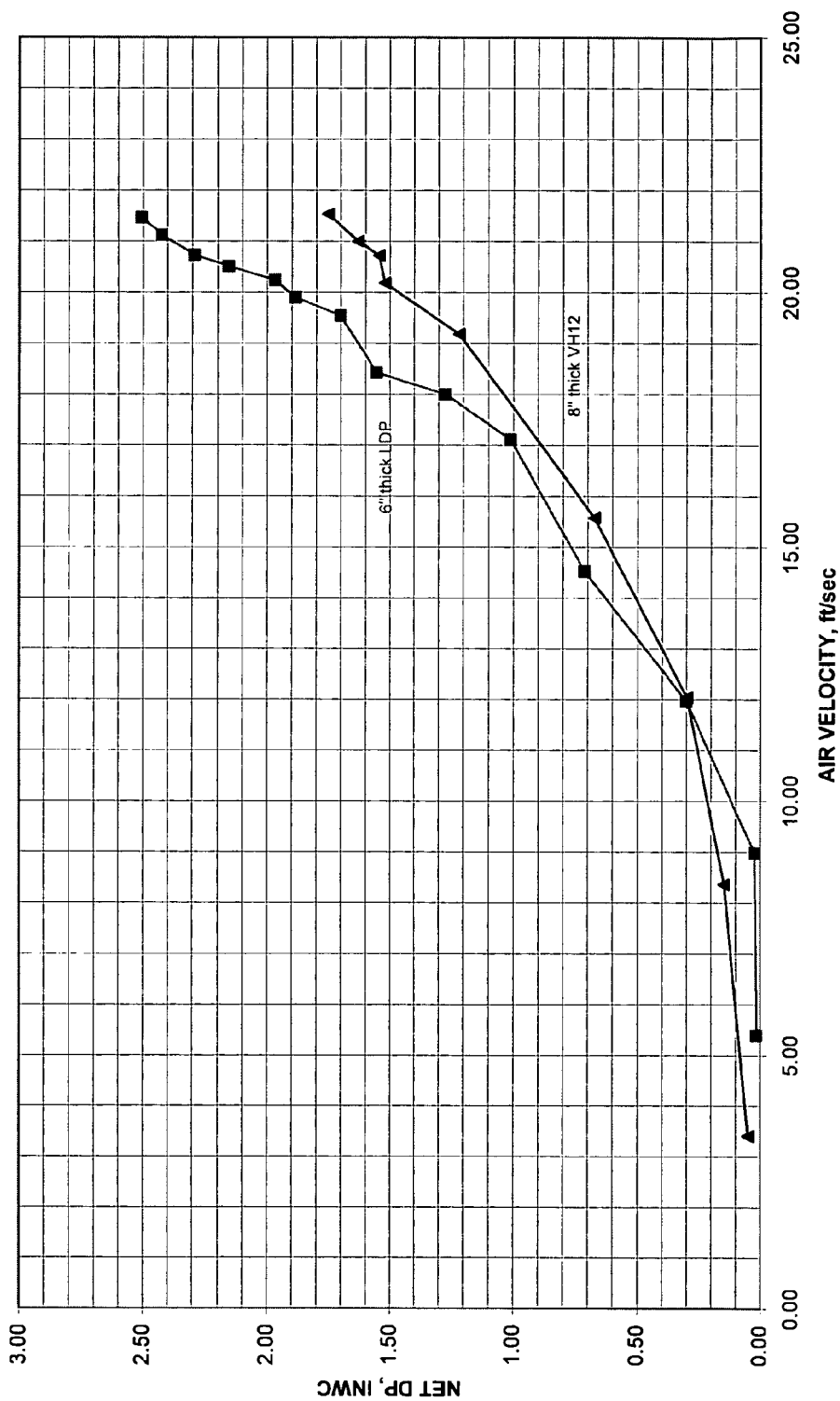
Figure 8:
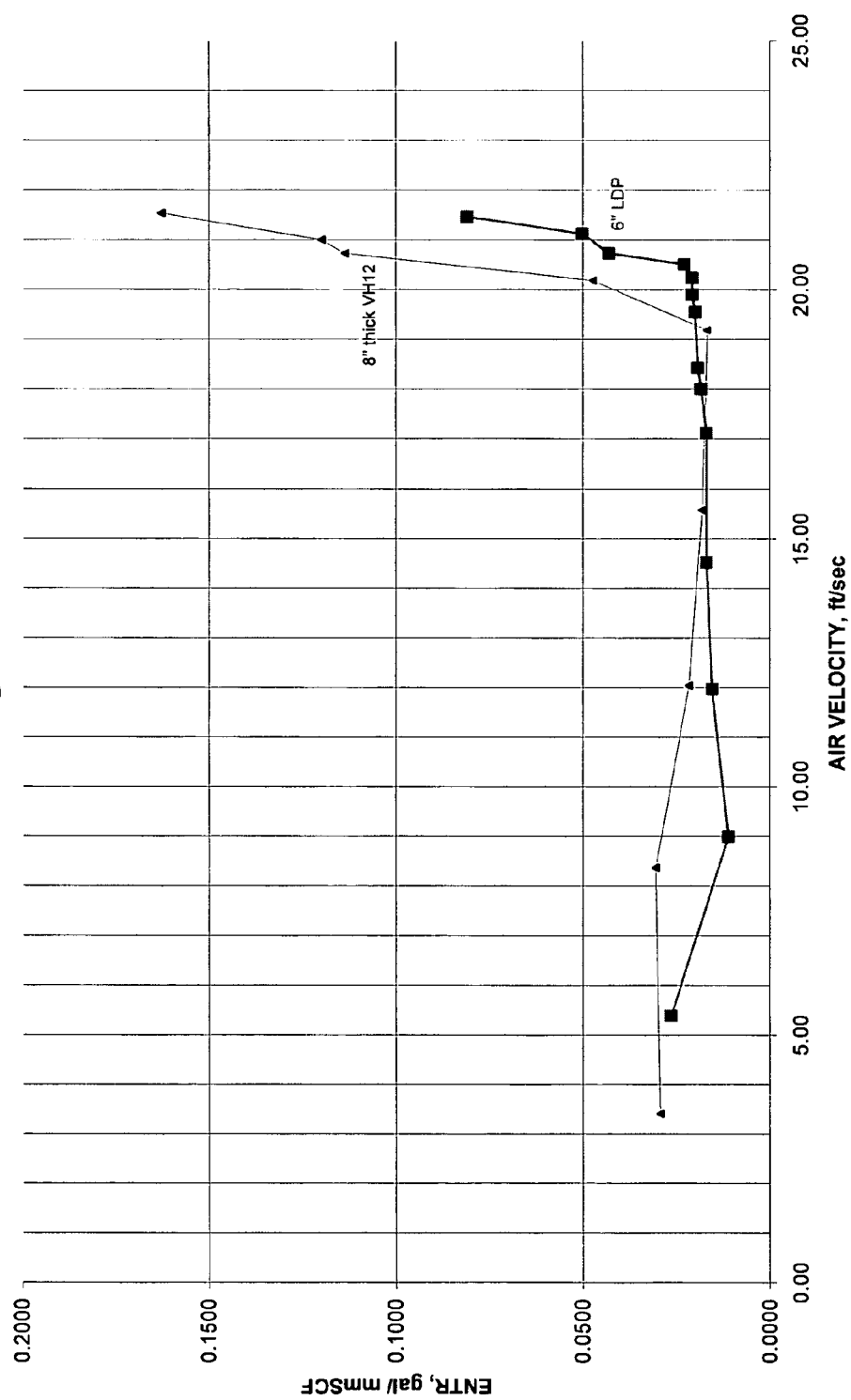

The present six inch LDP pad was tested against eight inches of standard undulating vanes with a spacing of one-half inch between vanes. As shown in FIG. 7, the pressure drop was slightly better for the vanes than the LDP pad, although FIG. 8 shows that breakthrough occurred at a higher air velocity using the LDP pad than the vanes.

Example 5

Figure 9:
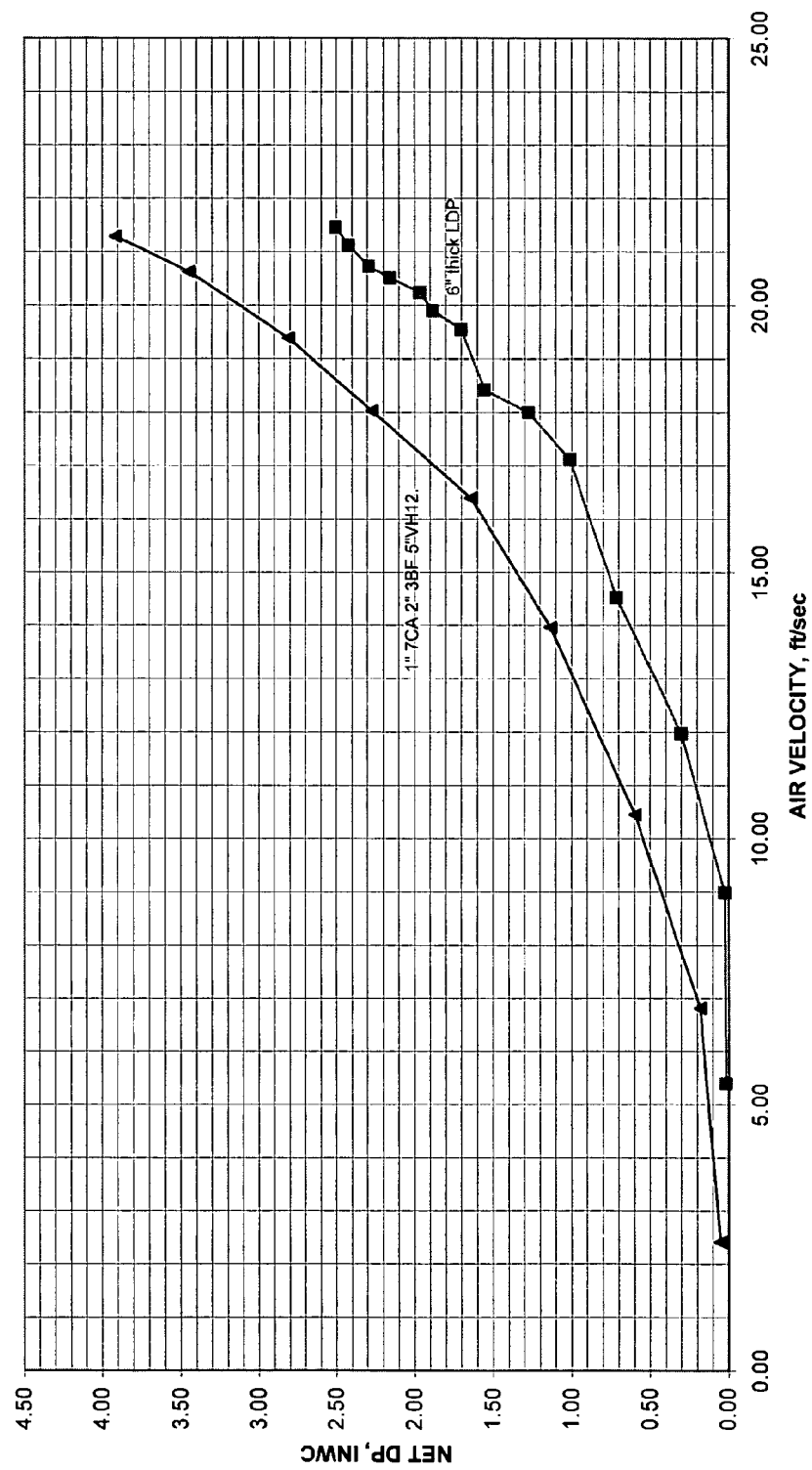
Figure 10:
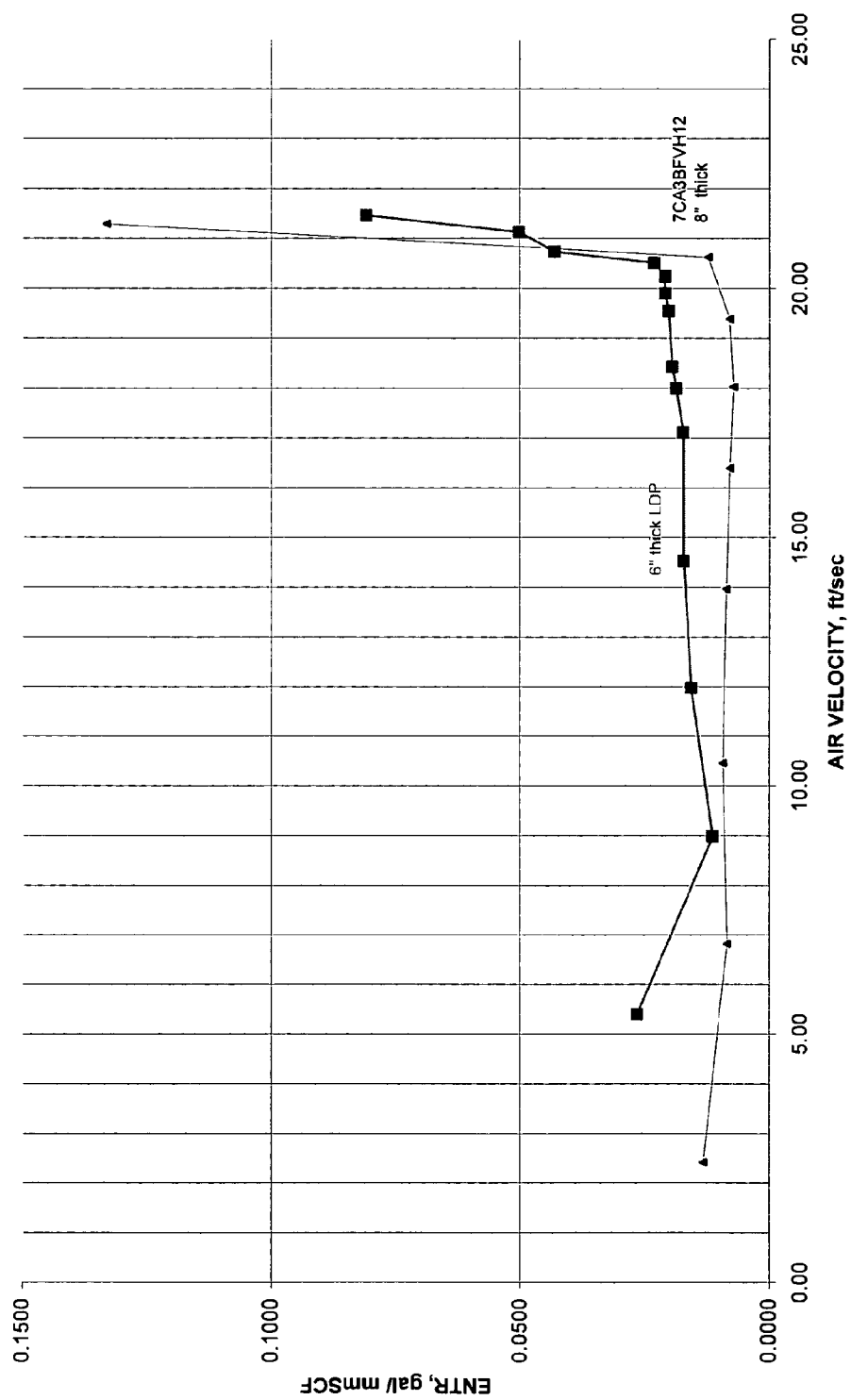

The present LDP pad was tested against an eight inch pad made using (upstream to downstream) one inch of the 7CA style mesh, two inches of 3BF style mesh, and five inches of the conventional vane (similar to Example 3 but reordered). FIG. 9 shows that the novel LDP pad exhibited a lower pressure drop over the entire air flow range and FIG. 10 shows that the LDP pad experiences breakthrough at about the same air velocity as the comparison pad.

These examples show that a multilayer pad having more layers than in the art provides a lower pressure drop, higher capacity, or both, in comparison with a separation device having a lower density and/or greater thickness. Only a thicker set of conventional vanes provided a lower pressure drop along much of the velocity range, yet breakthrough occurred at a lower velocity for the vanes than for the novel LDP pad.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A method for making a mist collector pad comprising:
   (a) forming a first zone of the mist collector pad by stacking one or more layers of a knitted wire mesh tube that has been (i) flattened and (ii) crimped twice;
   (b) forming a second zone of the mist collector pad by stacking one or more layers of a knitted wire mesh tube that has been (i) flattened and (ii) crimped once;
   (c) forming a third zone of the mist collector pad by stacking one or more layers of a knitted wire mesh tube that has been (i) flattened and (ii) crimped twice; and
   (d) securing the first, second, and third zones in a grid which is used to install the mist collector pad in a process gas stream so that during use of the mist collector pad, the first zone is upstream of the second zone and the second zone is upstream of the third zone;
   wherein:
   (I) the density of the second zone is greater than the density of the first zone;
   (II) the density of the second zone is greater than the density of the third zone; and
   (III) the wire meshes of the first, second, and third zones are selected so that during use of the mist collector pad, liquid droplets in a process gas stream land on the wire meshes, coalesce on the meshes, and then run off from the meshes due to gravity.

2. The method of claim 1 wherein each layer of the first zone is the same as each layer of the third zone.

3. The method of claim 1 wherein the first, second, and third zones are contiguous.

4. The method of claim 1 comprising the additional steps of:
   (e) forming a fourth zone of the mist collector pad by stacking one or more layers of a knitted wire mesh tube that has been (i) flattened and (ii) crimped once; and
   (f) securing the fourth zone in the grid so that during use, the third zone is upstream of the fourth zone;
   wherein:
   (I) the density of the fourth zone is greater than the density of the first zone;
   (II) the density of the fourth zone is greater than the density of the third zone; and
   (III) the wire mesh of the fourth zone is selected so that during use of the mist collector pad, liquid droplets in a process gas stream land on the wire mesh, coalesce on the mesh, and then run off from the mesh due to gravity.

5. The method of claim 4 wherein each layer of the first zone is the same as each layer of the third zone.

6. The method of claim 4 wherein each layer of the second zone is the same as each layer of the fourth zone.

7. The method of claim 6 wherein each layer of the first zone is the same as each layer of the third zone.

8. The method of claim 4 wherein the first, second, third, and fourth zones are contiguous.

9. A method for making a mist collector pad comprising:
   (a) forming a first zone of the mist collector pad by stacking one or more layers of a knitted wire mesh tube that has been (i) flattened and (ii) crimped once;
   (b) forming a second zone of the mist collector pad by stacking one or more layers of a knitted wire mesh tube that has been (i) flattened and (ii) crimped twice;
   (c) forming a third zone of the mist collector pad by stacking one or more layers of a knitted wire mesh tube that has been (i) flattened and (ii) crimped once; and
   (d) securing the first, second, and third zones in a grid which is used to install the mist collector pad in a process gas stream so that during use of the mist collector pad, the first zone is upstream of the second zone and the second zone is upstream of the third zone;
   wherein:
   (I) the density of the second zone is less than the density of the first zone;
   (II) the density of the second zone is less than the density of the third zone; and
   (III) the wire meshes of the first, second, and third zones are selected so that during use of the mist collector pad, liquid droplets in a process gas stream land on the wire meshes, coalesce on the meshes, and then run off from the meshes due to gravity.

10. The method of claim 9 wherein each layer of the first zone is the same as each layer of the third zone.

11. The method of claim 9 wherein the first, second, and third zones are contiguous.

12. The method of claim 9 comprising the additional steps of:
    (e) forming a fourth zone of the mist collector pad by stacking one or more layers of a knitted wire mesh tube that has been (i) flattened and (ii) crimped twice; and
    (f) securing the fourth zone in the grid so that during use, the third zone is upstream of the fourth zone;
    wherein:
    (I) the density of the fourth zone is less than the density of the first zone;
    (II) the density of the fourth zone is less than the density of the third zone; and
    (III) the wire mesh of the fourth zone is selected so that during use of the mist collector pad, liquid droplets in a process gas stream land on the wire mesh, coalesce on the mesh, and then run off from the mesh due to gravity.

13. The method of claim 12 wherein each layer of the first zone is the same as each layer of the third zone.

14. The method of claim 12 wherein each layer of the second zone is the same as each layer of the fourth zone.

15. The method of claim 14 wherein each layer of the first zone is the same as each layer of the third zone.

16. The method of claim 12 wherein the first, second, third, and fourth zones are contiguous.

* * * * *